United States Patent [19]

Gouttebessis

[11] 4,393,912
[45] Jul. 19, 1983

[54] PROCESS FOR THE MANUFACTURE OF TIRES BY MOLDING

[75] Inventor: Jacques Gouttebessis, La Mouteyre, France

[73] Assignee: Compagnie Generale des Etablissements Michelin, Clermont-Ferrand, France

[21] Appl. No.: 327,938

[22] Filed: Dec. 7, 1981

[30] Foreign Application Priority Data

Dec. 10, 1980 [FR] France ................................ 80 26258

[51] Int. Cl.³ ........................ B60C 3/00; B60C 13/00; B29H 17/02
[52] U.S. Cl. ........................... 152/353 R; 152/352 R; 152/357 A; 156/125; 156/160; 264/501; 264/229; 264/326; 264/328.3; 425/28 R
[58] Field of Search ................... 156/110 R, 160, 125, 156/113; 264/501–502, 229, 231, 326, 328.3; 152/330 R, 352–353, 357 A; 425/28 R

[56] References Cited

U.S. PATENT DOCUMENTS 2,331,795 10/1943 McMahan .......................... 152/352
4,061,171 12/1977 Boileau et al. ................. 152/353 R
4,088,168 5/1978 Boileau et al. ................. 152/357 A
4,185,065 1/1980 Knipp et al. ....................... 264/326

FOREIGN PATENT DOCUMENTS 2203030 1/1977 Fed. Rep. of Germany .
2658374 6/1978 Fed. Rep. of Germany .
2425334 1/1980 France ............................ 152/353 R Primary Examiner—Edward C. Kimlin
Assistant Examiner—Lois E. Boland
Attorney, Agent, or Firm—Brumbaugh, Graves, Donohue & Raymond

[57] ABSTRACT

In order that the stresses upon travel will be as small as possible in the region of the shoulders of a tire, it is molded between a mold and a core which together define a central zone and two lateral zones and, in each of the latter two, the median line of the sidewalls has a point of inversion of curvature located at a distance from the crown of the tire which is greater than the distance of the point of inversion of curvature of the median line of the sidewalls of the tire when mounted on its rim.

7 Claims, 1 Drawing Figure

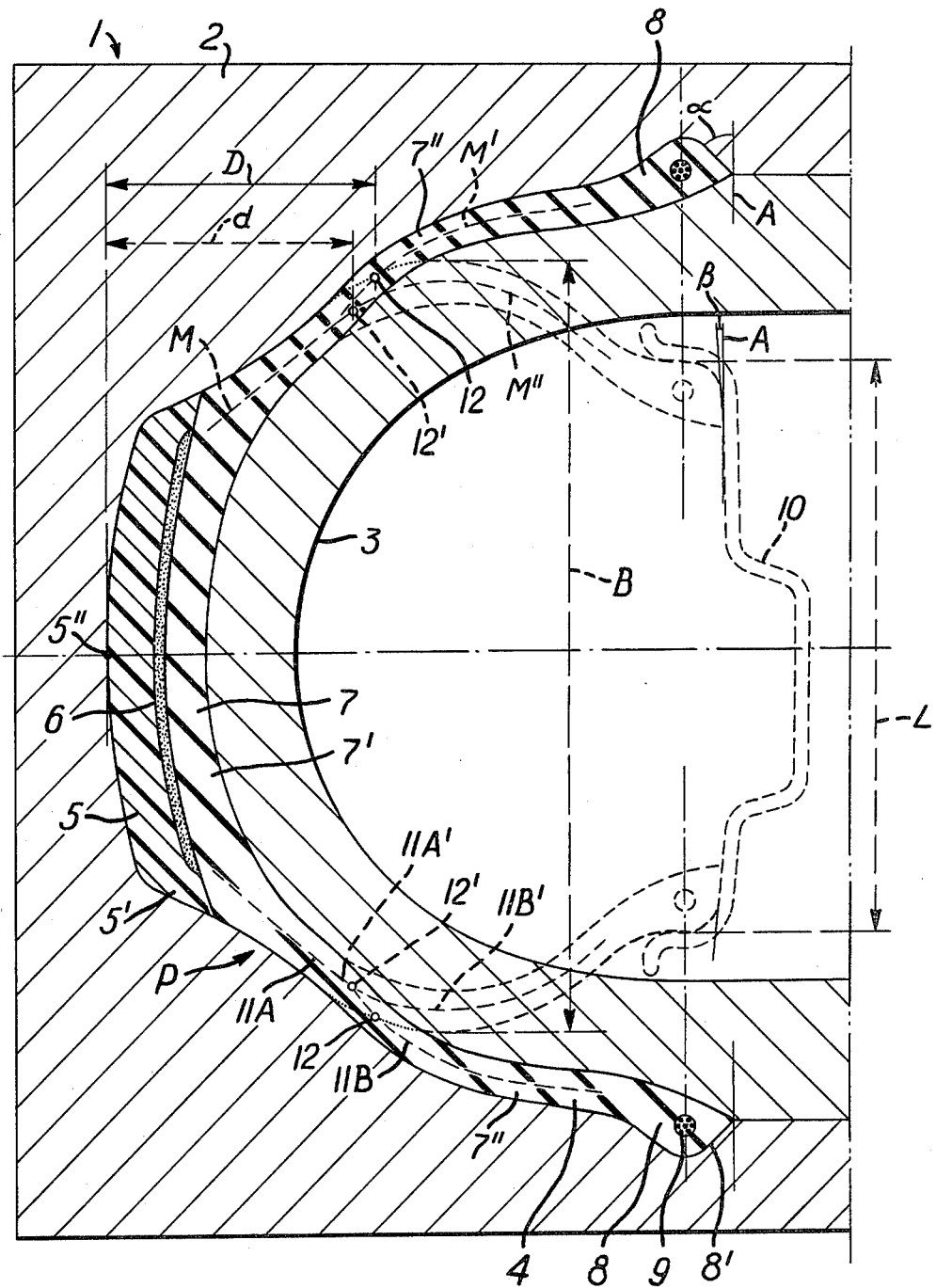

PROCESS FOR THE MANUFACTURE OF TIRES BY MOLDING

The present invention concerns, on the one hand, a process for manufacturing a tire from one or more liquid or paste materials which solidify in a mold to form the elastomeric mass of the tire, the tire being formed of a crown with a tread and possibly a crown reinforcement and of two sidewalls located on opposite sides of the crown which are without reinforcement and are each terminated by a reinforced bead intended to sit on a wheel rim, and, on the other hand, a tire manufactured by this process.

The mold for manufacturing such tires is formed by an envelope in one or more parts and of a rigid or deformable core arranged within the toroidal cavity of the envelope. The wall of the toroidal cavity of the envelope defines the outer surface of the tire from bead to bead. The outer wall of the core defines the inner surface of the tire, also from bead to bead. The liquid or paste material or materials are introduced in suitable quantities into the space between the core and the envelope, where they solidify. Due to the absence of inextensible reinforcements at least in the sidewalls of the tires of the type in question, the radial cross section of the tire in the mold is not necessarily that of the tire when mounted on its rim and inflated.

U.S. Pat. Nos. 4,061,171 and 4,088,168 call attention to the fact that in a tire of the type described above the buckling in the region of the shoulders of the tire, seen in radial cross section when mounted on a rim results, upon inflation, in shear stresses which are harmful to the life of the tire. In order to neutralize these shear stresses, i.e., make the radial deformations $\epsilon_r$ equal to the circumferential deformations $\epsilon_c$, these patents contemplate imparting a buckled contour to the median line of the radial cross section of the sidewalls of the tire when mounted and inflated.

The object of the present invention is to provide means for creating within the mounted but uninflated tire a state of stresses which, added to the stresses due to the inflation to operating pressure, neutralizes or at least minimizes the harmful shear stresses while retaining a buckled median line for the radial cross section of the tire.

Thus the invention consists of a process of manufacturing a tire from one or more liquid or paste materials which solidify in a mold, the tire being formed of a crown and of two sidewalls each terminated by a reinforced bead and each without reinforcement, the mold being formed by an envelope which defines the outer toroidal surface of the tire and by a core which defines the inner surface of the tire, in which process the tire is molded in a cross section different from that of the tire when mounted on its rim but not inflated, this process being characterized by the use of a mold in which, in radial cross section, the crown of the tire is arranged approximately the same axially and radially as in the tire mounted on its rim but not inflated, the sidewalls have lengths practically identical to those in the tire when mounted on its rim but not inflated and median lines each formed of two consecutive segments, namely, a first segment which is linear or concave towards the outside of the tire and is adjacent to the shoulder and a second segment which is concave towards the inside of the tire and is adjacent to the bead, the junction between the two segments being located at a radial distance from the crown which is greater than in the tire when mounted on its rim but not inflated, and the beads are arranged, on the one hand, approximately the same radially as in the tire when mounted on its rim but not inflated and, on the other hand, axially outward of their position on the rim.

The invention applies both to the case in which a tread is molded on top of the body of the tire, a crown reinforcement being possibly superimposed on the body, and to the case in which a tread and possibly a crown reinforcement are arranged in the mold prior to the filling of the mold with the material or materials intended to form the body of the tire. By reinforced bead there is understood a bead which is visibly more massive than the customary beads, for instance, by widening axially over a radial height corresponding to that of the rim flange, so as to make it inextensible under the effect of the operating pressure of the tire. The bead can also be reinforced by means of an annular inextensible element such as a ply of cables or a bead ring.

In order to facilitate the formation of a buckled median line, recourse is had preferably to two means. The first means resides in the fact that the relative distance between the axial positions of the bead in the mold and on the rim is greater than 0.5 (B−L/L) and less than 1.25 (B−L/L), B being the maximum axial width of the non-inflated tire on its rim and L being the width of the rim.

The second means resides in the fact that within the mold the base of the bead forms a larger angle with the axis of rotation of the tire than when the tire is mounted on its rim.

It is known to manufacture tires of the type claimed in molds whose radial cross section is different from that of the tires when mounted on their rim. Thus, West German Pat. No. 2,203,030 contemplates manufacturing in a first mold a quasi-cylindrical supporting assembly and then arranging in a second mold, on the one hand, this cylindrical support and, on the other hand, the crown of the tire and finally expanding the cylindrical support to the final toroidal shape of the tire so as to bond it against the crown. Such a manner of procedure prematurely confers considerable stresses of extension on the supporting assembly which the inflation of the tire to the operating pressure merely increases. These stresses jeopardize the life of the tire, because they do not entail the neutralizing of the shear stresses in the shoulders of the tire.

West German unexamined application for Pat. No. 2,658,374 shows a mold in which the envelope and the core have substantially parallel profiles in the form of an isosceles trapezoid, such that the axial distance between beads is greater than the axial width of the crown of the tire. Thus, the sidewalls of the tire upon emergence from the mold are rectilinear and could assume a convex shape only if the tire were mounted on a rim and inflated. The inflating of this tire merely increases the stresses of the sidewalls and does not cause the neutralization of the shear stresses in the shoulders.

The process of the invention, on the contrary, avoids the formation of harmful stresses. It not only makes it possible to impart a buckled contour to the median line of the sidewalls when the tire is mounted on the rim but also to neutralize the shear stresses in the shoulders. The inflating of the tire may further accentuate the buckling of the median line of the sidewalls, since in accordance with the invention, on the one hand, the crown occupies its final position with respect to the beads while, on the other hand, the sidewalls also have their final lengths.

The drawing, to which the following description refers, shows one embodiment of the invention.

The sole FIGURE of this drawing is a sectional view, along a radial plane, of a tire in its manufacturing mold and—in dashed line—on its rim.

The mold 1 comprises a rigid envelope 2 and a core 3 arranged in the cavity of the mold. This cavity defines the outer surface of the tire P while the outer wall of the core 3 defines the entire inner surface thereof.

In accordance with a preferred embodiment, the tire P within the mold 1 has a tread 5 provided with a crown reinforcement 6 and placed in the crown of the mold 1 prior to the filling of the mold 1 with the composition intended to form the elastomer of the tire. The body 7 of the tire P extends between the two beads 8 of the sidewalls. It has an equatorial portion 7' radially to the inside of the tread 5* and extended on both sides by sidewalls 7" without reinforcement, each terminated by a bead 8. These beads are reinforced by the fact that they each contain an inextensible annular element, for instance, an ordinary metal bead ring 9.

*(forming with the tread 5 and the crown reinforcement 6 the crown of the tire P)

In this same drawing, the tire P is shown mounted on its rim 10 but not inflated. The portions of the tire P whose positions on the rim are different from those occupied in the mold are shown in dashed line. The portions 5, 6 and 7' which form the crown of the tire are arranged, when the tire is mounted on the rim, in the same way as in the mold with respect to their dimensions in axial (with respect to the equatorial plane) and radial (with respect to the rotational axis of the tire) positions. The same is true with regard to the radial position of the bead rings 9 of the beads 8. On the other hand, the bead rings 9 and therefore the beads are located, when in the mold, axially outward of their position on the tire when mounted on its rim but not inflated, namely, at a relative distance equal, in this example, to 0.85 (B−L/L), B being the maximum axial width of the tire on its rim and L being the width of the rim, measured in accordance with the standardization in force. Preferably, the base 8' of the beads 8 forms within the mold an angle α greater than the angle β on the rim, these angles being masured with respect to a straight line A parallel to the axis of rotation (not shown) of the tire.

In accordance with the invention, the sidewalls 7" have the same length in the mold as in the tire mounted on its rim, but in the tire on its rim they occupy positions which are different not only with respect to their inner and outer walls but also with respect to the median line M—M' equidistant from these walls. Thus, in the mold the median line M—M' of each sidewall is formed of two consecutive segments 11A and 11B. The first of these segments (11A) is adjacent to the shoulder, that is to say to the edge 5' of the tread 5; it is substantially rectilinear, with a slight concavity towards the outside of the tire. The second of these segments (11B) is concave towards the inside of the tire and is adjacent the bead 8. At the junction 12 between the two segments 11A and 11B the median line M—M' is located within the mold 1 at a radial distance D from the crown (point 5") of the tire.

In the tire P mounted on its rim 10, on the other hand, in accordance with the invention the median line M—M" assumes a buckled contour, that is to say, starting from the shoulder it has a segment 11A' which is substantially rectilinear followed by a segment 11B' which is concave towards the inside of the tire. At the junction 12' between the segments 11A' and 11B' the median line M—M' is at a distance d from the crown 5" which is smaller than the distance D therefrom of the junction 12 in the mold between the segments 11A and 11B. In accordance with another preferred variant, when the tire is inflated to its operating pressure, the placing under tension of the sidewalls, which have no reinforcement, may modify the curvature of the two segments 11A' and 11B' and increase the buckling of the median line M—M" of the sidewalls.

When the tire is removed from the mold, it retains the same radial profile as that of the mold. In order to mount it on its rim 10 it is necessary to exert on the beads 8 a pressure which is directed towards the inside of the tire. This results in a change in the concavity of the segment 11B' and a displacement towards the shoulders 5' of the junction 12' between the segments 11A' and 11B'.

What is claimed is:

1. A process of manufacturing a tire from one or more liquid or paste materials which solidify in a mold, the tire being formed of a crown and of two sidewalls each terminated by a reinforced bead and each without reinforcement, the mold being formed by an envelope which defines the outer toroidal surface of the tire and by a core which defines the inner surface of the tire, in which process the tire is molded in a cross section different from that of the tire when mounted on its rim but not inflated, this process being characterized by the use of a mold in which, in radial cross section, the crown of the tire is arranged approximately the same axially and radially as in the tire mounted on its rim but not inflated, the sidewalls have lengths practically identical to those in the tire when mounted on its rim but not inflated and median lines each formed of two consecutive segments, namely, a first segment which is rectilinear or concave towards the outside of the tire and is adjacent to the shoulder and a second segment which is concave towards the inside of the tire and is adjacent to the bead, the junction between the two segments being located at a radial distance from the crown which is greater than in the tire when mounted on its rim but not inflated, and the beads are arranged, on the one hand, approximately the same radially as in the tire when mounted on its rim but not inflated and, on the other hand, axially outward of their position on the rim.

2. A process according to claim 1, characterized by the fact that the relative distance between the axial positions of the bead in the mold and on the rim is greater than 0.5 (B−L/L) and less than 1.25 (B−L/L), B being the maximum axial width of the non-inflated tire on its rim and L being the width of the rim.

3. A process according to claim 1 or 2, characterized by the fact that within the mold the base of the bead forms a larger angle with the axis of rotation of the tire than when the tire is mounted on its rim.

4. A process according to claim 1, characterized by the fact that between the zone of greatest axial width of the tire mounted on its rim but not inflated and each of the beads of the tire the median line of the sidewalls is concave towards the inside of the tire.

5. A process according to claim 1, characterized by the fact that a tread is molded on top of the body of the tire.

6. A process according to claim 1, characterized by the fact that prior to filling the mold a tread and possibly a crown reinforcement are placed in the mold.

7. A tire manufactured by the process in accordance with claim 1.

* * * * *